(12) United States Patent
Stratton et al.

(10) Patent No.: US 6,952,042 B2
(45) Date of Patent: Oct. 4, 2005

(54) MICROELECTROMECHANICAL DEVICE WITH INTEGRATED CONDUCTIVE SHIELD

(75) Inventors: Thomas G. Stratton, Roseville, MN (US); Gary R. Gardner, Golden Valley, MN (US); Curtis H. Rahn, Plymouth, MN (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/172,865

(22) Filed: Jun. 17, 2002

(65) Prior Publication Data

US 2003/0230147 A1 Dec. 18, 2003

(51) Int. Cl.$^7$ .......................... H01L 27/14; H01L 29/82
(52) U.S. Cl. ...................... 257/418; 257/414; 257/417; 257/419; 438/50; 438/51; 438/52; 73/715; 73/718
(58) Field of Search ........................ 257/414, 417–419, 257/467–470; 438/48, 50–55; 73/715, 718

(56) References Cited

U.S. PATENT DOCUMENTS

| | | | |
|---|---|---|---|
| 4,463,336 A | 7/1984 | Black et al. | .................. 372/94 |
| 4,771,639 A | 9/1988 | Saigusa et al. | |
| 6,441,451 B1 * | 8/2002 | Ikeda et al. | .................. 257/418 |
| 6,465,856 B2 * | 10/2002 | Gulvin et al. | ............... 257/422 |

FOREIGN PATENT DOCUMENTS

JP    09061456 A  *  3/1997

OTHER PUBLICATIONS

Stark, B.H. et al., "An Ultra–Thin Hermetic Package Utilizing Electroplated Gold" Tranducers ' 01 Eurosensors XV. 11$^{th}$ International Conference On Solid–State Sensors and Actuators. Digest of Technical Papers. Munich, Jun. 10–14, 2001, International Conference On Solid–State Sensors and Actuators. Digest of Technical Papers, BER, vol. 1, Jun. 10, 2001 pp. 194–197, XP002252460. ISBN:3–540–42150–5.

* cited by examiner

Primary Examiner—Donghee Kang
(74) Attorney, Agent, or Firm—McDonnell Boehnen Hulbert & Berghoff LLP

(57) ABSTRACT

A microelectromechanical device and method of fabricating the same, including a layer of patterned and deposited metal or mechanical-quality, doped polysilicon inserted between the appropriate device element layers, which provides a conductive layer to prevent the microelectromechanical device's output from drifting. The conductive layer may encapsulate of the device's sensing or active elements, or may selectively cover only certain of the device's elements. Further, coupling the metal or mechanical-quality, doped polysilicon to the same voltage source as the device's substrate contact may place the conductive layer at the voltage of the substrate, which may function as a Faraday shield, attracting undesired, migrating ions from interfering with the output of the device.

36 Claims, 10 Drawing Sheets

MICROELECTROMECHANICAL DEVICE WITH INTEGRATED CONDUCTIVE SHIELD

FIELD

The present invention is related to integrated microelectromechanical devices and more particularly, to semiconductor microelectromechanical devices with an integrated conductive shield, and a method for manufacturing the same.

BACKGROUND

Microelectromechanical devices are useful in many applications. These devices range from automobile sensors to actuators used on space exploration vehicles. Generally, these sensors and actuators provide information about environmental conditions, and/or react to changes in the environmental conditions. For instance, a microelectromechanical-pressure-sensor device may be used to measure an automobile's engine manifold pressure (or vacuum). In operation, the microelectromechanical-pressure-sensor device provides an electrical output that is proportional to the manifold pressure (or vacuum). This electrical output may be used by an engine management system for controlling fuel delivery to the automobile's engine.

In another useful application, one or more microelectromechanical-accelerometer devices may be employed for measuring the acceleration or, conversely, the deceleration of a vehicle. In crash situations, these devices may enable a crash detection system to determine whether to deploy an airbag.

Additionally, microelectromechanical devices are pervasively deployed in many types of industrial equipment. From simple single-fixture assembly machines to high-volume complex machinery, these microelectromechanical devices supply feedback for process and quality control.

Microelectromechanical devices may be incorporated as components in many medical equipment devices, such as respiration devices, dialysis machines, and infusion pumps. In surgical procedures, physicians are aided by data from various pieces of surgical equipment that employ microelectromechanical devices. These devices generally furnish information about the surrounding area in which the surgeon is operating. For example, the gage or absolute pressure of the area in which a catheter is positioned may be provided by an electrical output of a microelectromechanical-sensor device installed on the tip of the catheter. During an operation or other medical procedure, this electrical output may provide valuable feedback to the surgeon.

These cited examples indicate the breadth of microelectromechanical devices used in various applications in today's automated world, however many other microelectromechanical devices exist. Moreover, the types of devices, and their related applications continue to proliferate. Due to the widespread adoption and the ever-decreasing size of microelectromechanical devices, maintaining or improving the quality and performance of these devices may require implementing device and process control improvements so that the devices perform accurately, reliably, reproducibly, and repeatedly.

Environmental conditions acting on or impressed upon environmentally susceptible microelectromechanical devices may cause unwanted effects that may prevent the devices from attaining acceptable performance levels. These environmental conditions, which often contain energy in one form or another, may cause undesired effects, such as drift or instability, in the device's electrical output. To reduce or eliminate the drift or instability, a system and method that minimizes or eliminates the undesirable exchange of energy would be desirable.

SUMMARY

According to one embodiment, a semiconductor microelectromechanical device, such as a pressure sensor or accelerometer, may include a substrate over which a sensing element is formed. A conductive shield may be fabricated over at least a portion of the sensing element. Further, the conductive shield may be coupled with a substrate. By this coupling, the conductive shield and substrate may form an encapsulation of at least a portion of the sensing element. Moreover, coupling the conductive shield with the substrate may allow placing both the conductive shield and substrate at substantially the same voltage.

BRIEF DESCRIPTION OF THE DRAWINGS

Exemplary embodiments are described below in conjunction with the appended figures, wherein like reference numerals refer to like elements in the various figures, and wherein.

DETAILED DESCRIPTION

The embodiments of the microelectromechanical device described herein are described in relation to a preferred microelectromechanical pressure sensor and its architectural components. The described architecture and processes for fabricating the microelectromechanical pressure sensor are likewise applicable to other microelectromechanical devices.

Figure 1:
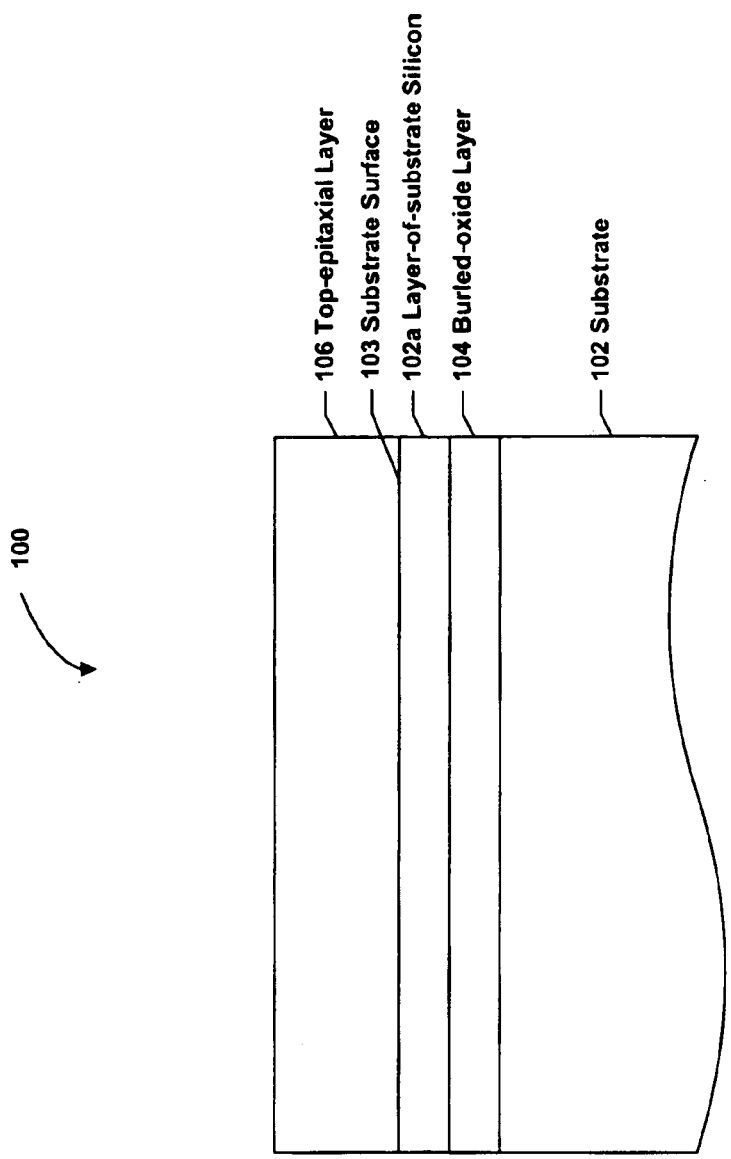
FIG. 1 is a conceptual diagram illustrating a side cross-section of a microelectromechanical device's substructure at a first phase of processing.

FIG. 1 is a conceptual drawing illustrating an embodiment of a cross-section of the substructure of a microelectromechanical device 100 at a first processing phase. While FIG. 1 and other subsequent figures illustrate the microelectromechanical device's substructure at certain processing phases, these phases are for illustration purposes only and not necessarily intended to limit the scope of the present embodiments, provide sequential processing steps, or provide an inflexible fabrication recipe.

Referring to FIG. 1, the microelectromechanical device 100 includes a substrate 102, a layer-of-substrate silicon 102a, a buried-oxide layer 104, and a top-epitaxial layer 106 deposited atop the layer-of-substrate silicon 102a.

The substrate 102 may include non-semiconductor substrate material, such as sapphire or ceramic, and/or may include semiconductor substrate material, such as an N-type or a P-type silicon wafer. Preferably, the substrate 102 is a bulk silicon substrate. Silicon enables the use of many common silicon semiconductor-processing techniques, such as masks, implants, etchings, dopings, and others. In the preferred microelectromechanical pressure sensor, the substrate 102 devices may be fabricated from a heavily P-type doped silicon wafer.

The substrate 102 may exist in the final microelectromechanical device or may be removed during processing. For instance, in fabricating the preferred microelectromechanical pressure sensor, the "backside" of the substrate 102 may be etched away to form a silicon diaphragm for sensing pressure. Accordingly, the substrate 102 may contain one or more openings for forming and for providing access to the diaphragm. In other embodiments, the substrate 102 may contain openings for suspending moveable elements of the microelectromechanical device. To create these openings, portions of the substrate 102 may be etched using chemical etching processes.

Implanted in the substrate 102 is the buried-oxide layer 104. Preferably, this buried-oxide layer 104 is created in the substrate 102 using a Separation by IMplantation of OXygen (SIMOX) process. Alternatively, the buried-oxide layer 104 may be formed using a Bonded Silicon On Insulator (BSOI), Bonded and Etchback Silicon On Insulator (BESOI), or other similar process. Other processes for creating the buried-oxide layer 104 are possible as well. During the SIMOX process, oxygen ions are implanted into one or more surfaces of a bulk-silicon substrate using an ion-implantation process. Preferably, the oxygen ions are implanted through only one surface, such as substrate surface 103. By controlling the ion-implanting process, the oxygen atoms that are implanted into the substrate 102 via the substrate surface 103 create the buried-oxide layer 104 at a predetermined depth below the surface of the substrate.

Creating the buried-oxide layer 104 beneath the substrate surface 103 results in a layer-of-substrate silicon 102a resting above buried-oxide layer 104. This layer-of-substrate silicon 102a comprises a layer of bulk substrate that is isolated from the remaining bulk substrate by the buried-oxide layer 104. In a preferred embodiment, the layer-of-substrate silicon 102a and the substrate 102 "sandwich" the buried-oxide layer 104. This layer-of-substrate silicon 102a provides a base upon which other layers of the microelectromechanical device elements may be formed.

The SIMOX process may also include a high-temperature anneal process during and after creating the buried-oxide layer 104 to facilitate enhanced control over the ion-implant process, and to minimize defects in the substrate surface. After the high-temperature anneal, the unit cells of the substrate are preferably arranged in a single-crystal silicon structure. This single crystalline structure provides a surface upon which a single-crystal epitaxial silicon layer may be deposited.

Using standard epitaxial techniques and processes, the top-epitaxial layer 106 may be deposited over the substrate 102. In an exemplary configuration, the top-epitaxial layer 106 is deposited over the layer-of-substrate silicon 102a. The standard epitaxial techniques and processes for depositing the epitaxial layer 106 include chemical vapor deposition (CVD), atmospheric pressure chemical vapor deposition (APCVD), low-pressure chemical vapor deposition (LPCVD), plasma enhanced chemical vapor deposition (PECVD), and other deposition techniques.

Further, dopant materials may be introduced during the deposition process, which may cause the top-epitaxial layer 106 to become electrically conductive. Alternatively, the top-epitaxial layer 106 may be doped subsequent to deposition.

The combined thickness of the top-epitaxial layer 106 and the layer-of-substrate silicon 102a may provide useable silicon for creating one or more elements of microelectromechanical devices. The thickness of the top-epitaxial layer 106 added to the layer-of-substrate silicon 102a may vary depending on the type of circuit or microelectromechanical device. For instance, the combined thickness of the top-epitaxial layer 106 and the layer-of-substrate silicon 102a varies from CMOS circuitry, in which the overall thickness of the CMOS circuitry typically ranges from about 500 Å to 2000 Å, to bipolar circuitry, in which the overall thickness of the bipolar circuitry may range from 0.3 $\mu$m to 10 $\mu$m. As overall thicknesses of other devices vary, the combined thickness of the top-epitaxial layer 106 and the layer-of-substrate silicon 102a may likewise vary.

Figure 2:
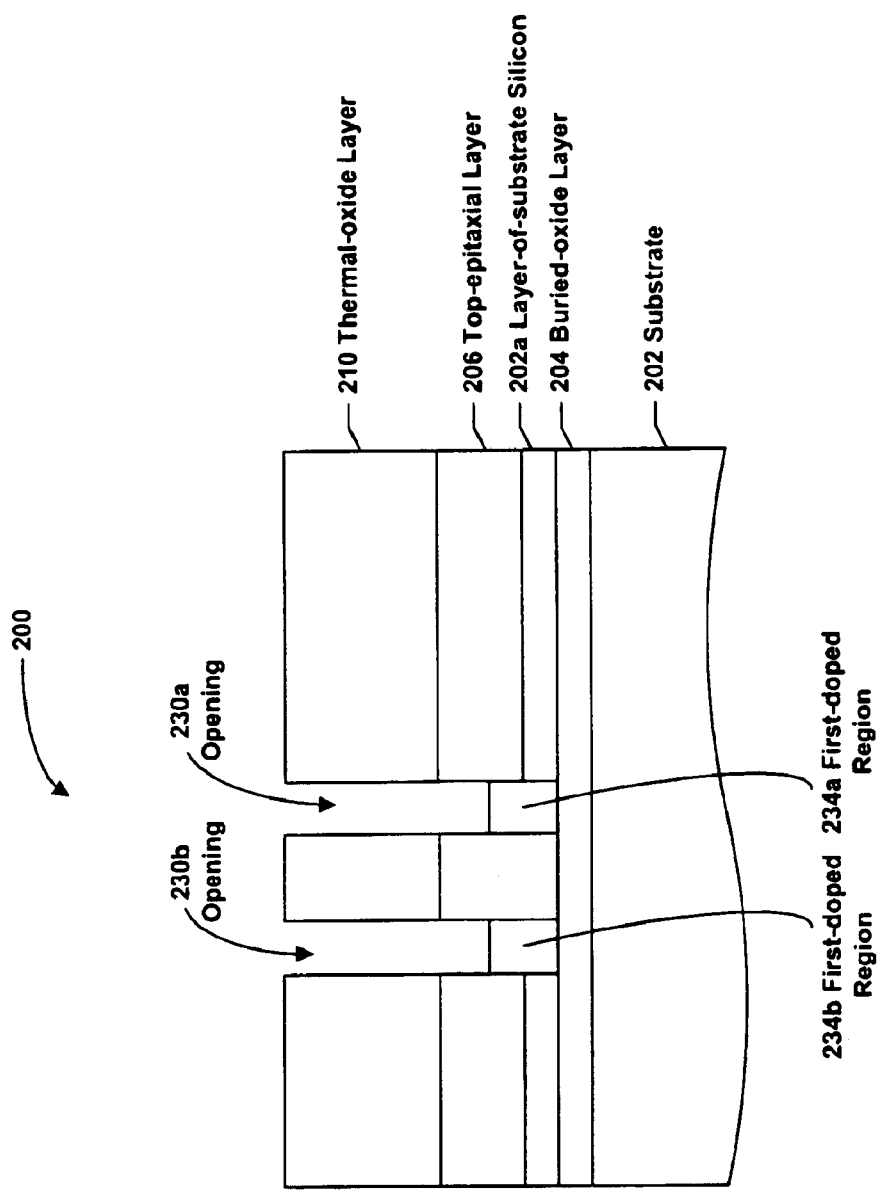
FIG. 2 is a conceptual diagram illustrating a side cross-section of a microelectromechanical device's substructure at a second phase of processing.

FIG. 2 is a conceptual drawing illustrating an embodiment of a cross-section of the substructure of a microelectromechanical device 200 at a second processing phase. As illustrated in FIG. 2, the microelectromechanical device 200 includes a substrate 202, a layer-of-substrate silicon 202a, a buried-oxide layer 204, a top-epitaxial layer 206, and a thermal-oxide layer 210 formed or "grown" over applicable areas of the top-epitaxial layer 206.

In a preferred embodiment, the substrate 202 comprises a heavily doped P-type silicon substrate, and the buried-oxide layer 204 comprises a buried silicon dioxide ($SiO_2$) layer. The top-epitaxial layer 206 may be an N-type top-epitaxial layer. Preferably, the thermal-oxide layer 210 is formed as an $SiO_2$ layer that is "grown" atop the N-type top-epitaxial layer.

The microelectromechanical device 200 may also include openings 230a and 230b that are patterned and etched from the thermal-oxide layer 210. Openings 230a and 230b are created for selectively doping the underlying layers, such as the top-epitaxial layer 204 and the layer-of-substrate silicon 202a, exposed by the openings 230a and 230b. These underlying layers may be doped using ion-implantation and/or diffusion. Although FIG. 2 shows only two openings in the thermal-oxide layer 210, namely openings 230a and 230b, the substructure of the microelectromechanical device 200 may include additional openings in the thermal-oxide layer 210. Alternatively, the substructure of the microelectromechanical device 200 may include only one opening in the thermal-oxide layer 210.

Further included in the substructure of the microelectromechanical device 200 are a number of first-doped regions, illustrated as first-doped regions 234a and 234b. First-doped regions 234a and 234b may be created by either diffusing or ion implanting the appropriate dopant material into layers of the microelectromechanical device exposed by openings 230a and 230b, respectively. In a preferred embodiment, the first-doped regions 234a and 234b may be created by diffusing or by ion-implanting a P-type dopant into an N-type top-epitaxial layer through openings in a SiO$_2$ thermal-oxide layer. The microelectromechanical device 200 may also include an implant oxide layer grown over the areas exposed by the openings 230a and 230b. This implant oxide is used for protecting the areas exposed by openings 230a and 230b during the doping process.

Although FIG. 2 illustrates only two first-doped regions, namely first-doped regions 234a and 234b, the substructure of the microelectromechanical device 200 may include more than two first-doped regions. Alternatively, the substructure of the microelectromechanical device 200 may include only one first-doped region. The microelectromechanical device may also include other beneficial and sacrificial layers typically used in integrated circuit processing.

Figure 3:
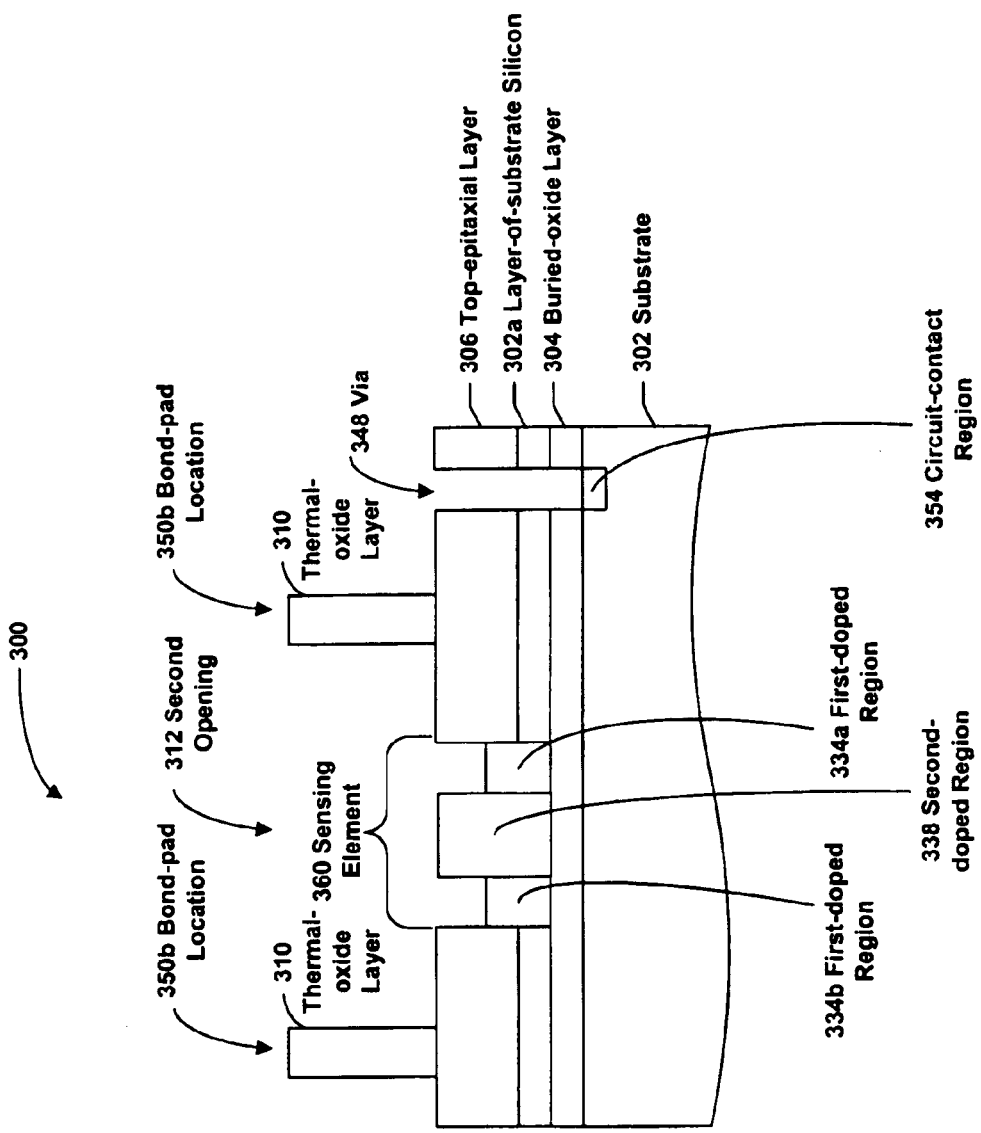
FIG. 3 is a conceptual diagram illustrating a side cross-section of a microelectromechanical device's substructure at a third phase of processing.

FIG. 3 is a conceptual drawing illustrating an embodiment of a cross-section of the substructure of a microelectromechanical device 300 at a third processing phase. FIG. 3 shows an exemplary microelectromechanical device 300, which is similar to the microelectromechanical device 200 in most respects, except as described herein. As illustrated in FIG. 3, the microelectromechanical device 300 includes a substrate 302, a layer-of-substrate silicon 302a, a buried-oxide layer 304, a top-epitaxial layer 306, a thermal-oxide layer 310, at least one second opening 312, first-doped regions 334a and 334b, at least one second doped region 338, bond-pad locations 350a and 350b, and a sensing element 360.

The thermal-oxide layer 310 of the microelectromechanical device 300 is patterned and etched or otherwise removed to create at least one second opening 312. Except for locations reserved for runners, connection paths and/or bond pads, such as bond pad locations 350a and 350b, the second opening 312 exposes all areas of the top-epitaxial layer 306. Given that the thermal-oxide layer 310 generally provides a barrier that shields underlying layers from being altered during processing, by creating the second opening 312 any of the several of the underlying layers may be altered with additional processing.

As such, at least one second-doped region 338 may be created by blanket doping the exposed top-epitaxial layer 306. If, for example, the top-epitaxial layer 306 is N-type, then preferably, the second-doped region 338 is P-type. This P-type region may be created by blanket doping the N-type top-epitaxial layer using P-type dopants. Blanket doping also increases the concentration of dopant atoms in the previously doped areas of the top-epitaxial layer 306. Thus, blanket doping an N-type top-epitaxial layer with a sufficient quantity of P-type dopant causes a previously un-doped or counter-doped area of the N-type top-epitaxial layer to become a P-type doped region. Also, blanket doping the previously P-type doped regions, such as first-doped regions 334a and 334b, with a sufficient quantity of P-type dopant causes an increase in dopant concentration. To protect the underlying top-epitaxial layer from damage during the blanket doping process, the microelectromechanical device 300 may optionally include an implant oxide grown over the exposed areas of top-epitaxial layer 306.

As noted above, the microelectromechanical device 300 also includes sensing element 360. Preferably, the sensing element 360 is composed of the first-doped regions 334a and 334b, and the second-doped region 338. The sensing element 360 may provide the sensing component of the preferred microelectromechanical pressure sensor as well as of other microelectromechanical devices, such as accelerometers, magnetoresistive sensors or gyroscopes. In these devices, it may comprise conductive elements, capacitive elements, or other sensing components. The sensing element 360 may also comprise diodes and transistors. Other configurations are possible as well.

During one of the various phases of processing, certain features or components of the microelectromechanical device 300 may be fabricated for use in subsequent fabrication phases. Depending on the configuration and type of microelectromechanical device being fabricated, during the fabrication of the device, material from one or more layers may be removed to provide for access to underlying layers. Access to an underlying layer in one phase of the processing may be available for subsequent processing in later phases. Accordingly, the microelectromechanical device 300 includes at least one via 348, which provides access to the substrate 302.

The via 348 is created by patterning and etching or otherwise removing a predetermined volume of material from layers of the microelectromechanical device 300. Included in the material removed from the layers are portions of the top-epitaxial layer 306, the buried-oxide layer 304, the layer-of-substrate silicon 302a, and/or any other beneficial or sacrificial layer below the thermal-oxide layer 310.

Like the via 348, during the processing of the microelectromechanical device 300, other features or components, such as circuit-contact region 354, may be fabricated in one phase for later processing. Preferably, circuit-contact region 354 is fabricated over the area of the substrate 302 exposed by via 348. The circuit-contact region 354 may be fabricated by doping the exposed area of the substrate 302. Alternatively, the circuit-contact region 354 may be fabricated by doping the exposed area of the substrate 302, and then reacting the doped area with platinum. Preferably, in a heavily P-type doped silicon substrate, such as substrate 302, the circuit-contact region 354 comprises an N+circuit-contact region.

Figure 4:
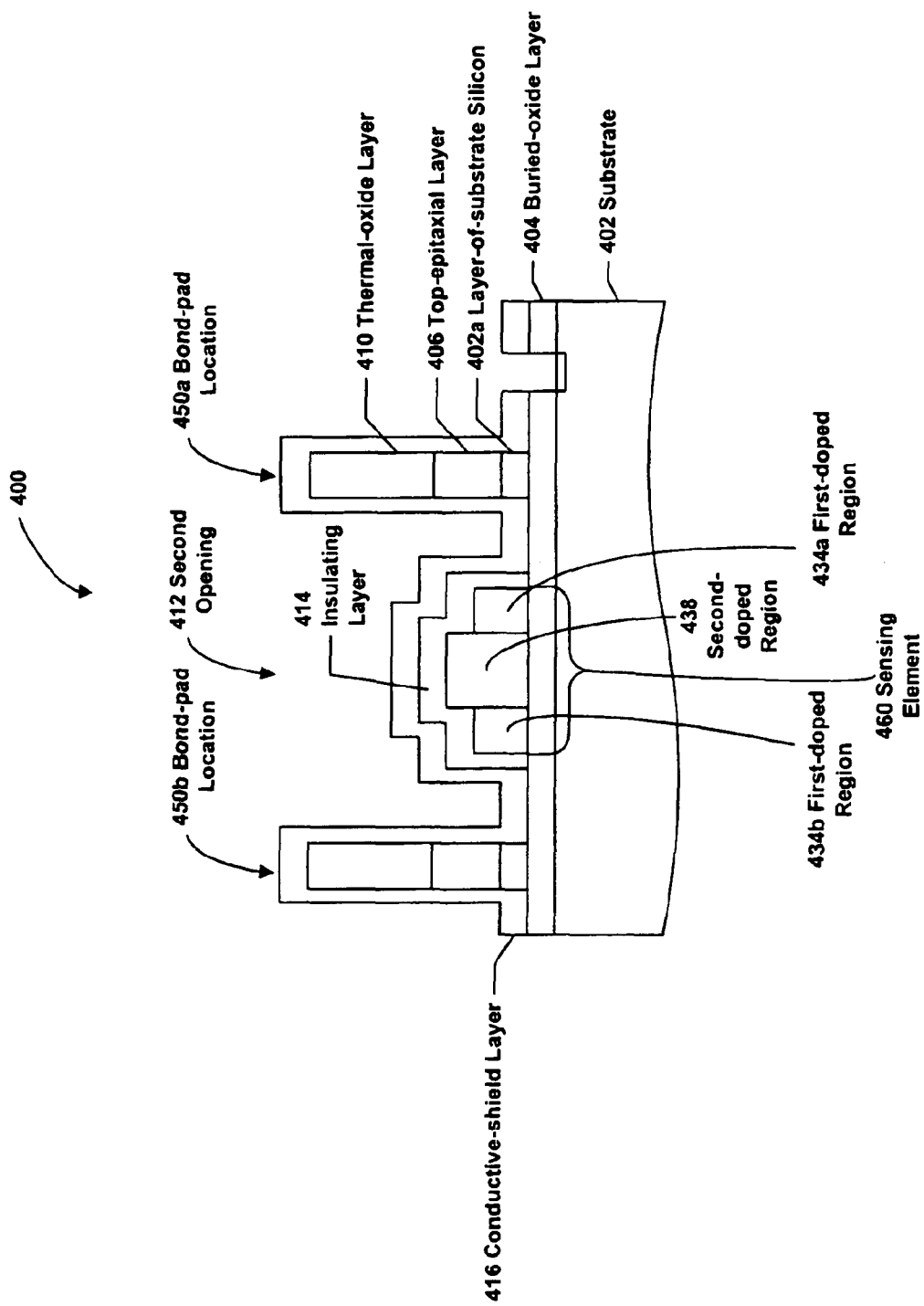
FIG. 4 is a conceptual diagram illustrating a side cross-section of an exemplary embodiment of a semiconductor microelectromechanical device with integrated conductive shield at a fourth phase of processing.

FIG. 4 is a conceptual drawing illustrating an embodiment of a cross-section of the substructure of a microelectromechanical device 400 at a fourth processing phase. As illustrated in FIG. 4, the microelectromechanical device 400 includes a substrate 402, a layer-of-substrate silicon 402a, a buried-oxide layer 404, a top-epitaxial layer 406, a thermal-oxide layer 410, at least one second opening 412, first-doped regions 434a and 434b, at least one second-doped region 438, bond pad locations 450a and 450b, and a sensing element 460. In addition, the microelectromechanical device 400 may include an insulating layer 414 and a conductive-shield layer 416 formed over the substrate 402.

In an exemplary embodiment, the insulating layer 414 is deposited directly over the sensing element 460. Preferably, the insulating layer 414 may be fabricated from silicon dioxide (SiO$_2$) using one of the various types of CVD deposition noted above. However, the insulating layer 414 may be fabricated using other processes that employ other oxides or insulators. In addition to providing a chemical barrier, the insulating layer 414 may function as an electrical insulator that separates the sensing element 460 from other components. Further, the insulating layer 414 may provide a mechanical barrier to protect the sensing element 460 from mechanical damage during processing.

The microelectromechanical device includes a conductive-shield layer 416 formed over the sensing element 460. In a multi-level, layered embodiment, the conductive-shield layer 416, as deposited, may follow the form of the underlying layers including the sensing element 460. Preferably, the conductive-shield layer 416 is formed from a doped polysilicon layer. As described in more detail below, the conductive-shield layer 416 may be alternatively comprised of a layer of metal or metallic materials.

The conductive-shield layer 416 formed from doped polysilicon may be deposited over some or all of the substrate 402 using one or more of the various CVD processes noted above. Further, the doping of the doped-polysilicon layer may occur using Phosphorus Oxychloride (POCl$_3$) depositon and drive in operations. Alternatively, the doping may occur simultaneously with the deposition. Alternatively, the doping may occur after deposition of the polysilicon using an ion implantation process.

Maintaining the modulus of elasticity (Young's Modulus) of the conductive-shield layer 416 at about the same Young's modulus when doping the layer of polysilicon may prevent a number of undesired effects in the output of the microelectromechanical device 400. Included among these undesirable effects are mechanical and thermal hystereses. Accordingly, the mechanical elasticity of the conductive-shield layer 416 preferably reflects the modulus of elasticity (Young's Modulus) of the layers underlying the conductive-shield layer 416, including the sensing element 460. To provide such mechanical elasticity, the conductive-shield layer 416 is preferably formed from a layer of polysilicon doped with a 1E+15 atoms/cm$^2$ Boron dose. The conductive-shield layer 416 may be formed from polysilicon that is doped using other dopants and dosages as well.

As noted above, the microelectromechanical device 400 may include a conductive-shield layer 416 comprised of metal or metallic materials, such as Tungsten (W), Chromium (Cr) or Beryllium (Be). In such case, the metal or metallic materials composing the conductive-shield layer 416 may be selected so that metal or metallic materials exhibit a Young's Modulus substantially similar to that of the modulus of elasticity (Young's Modulus) of the layers underlying the conductive-shield layer 416. Further, hysteresis in the output of the microelectromechanical device 400 may be prevented if the metal or metallic material that composes the conductive-shield layer 416 is maintained within its elastic deformation region.

FIGS 5A, 5B, 5C and 5D are conceptual drawings illustrating embodiments of a cross-section of the substructure of a microelectromechanical device 500 at a fifth processing phase. Each of the FIGS. 5A–D shows the exemplary microelectromechanical device 500 with integrated conductive shield, which is similar to the microelectromechanical device 400 in most respects, except as described herein.

Figure 5A:
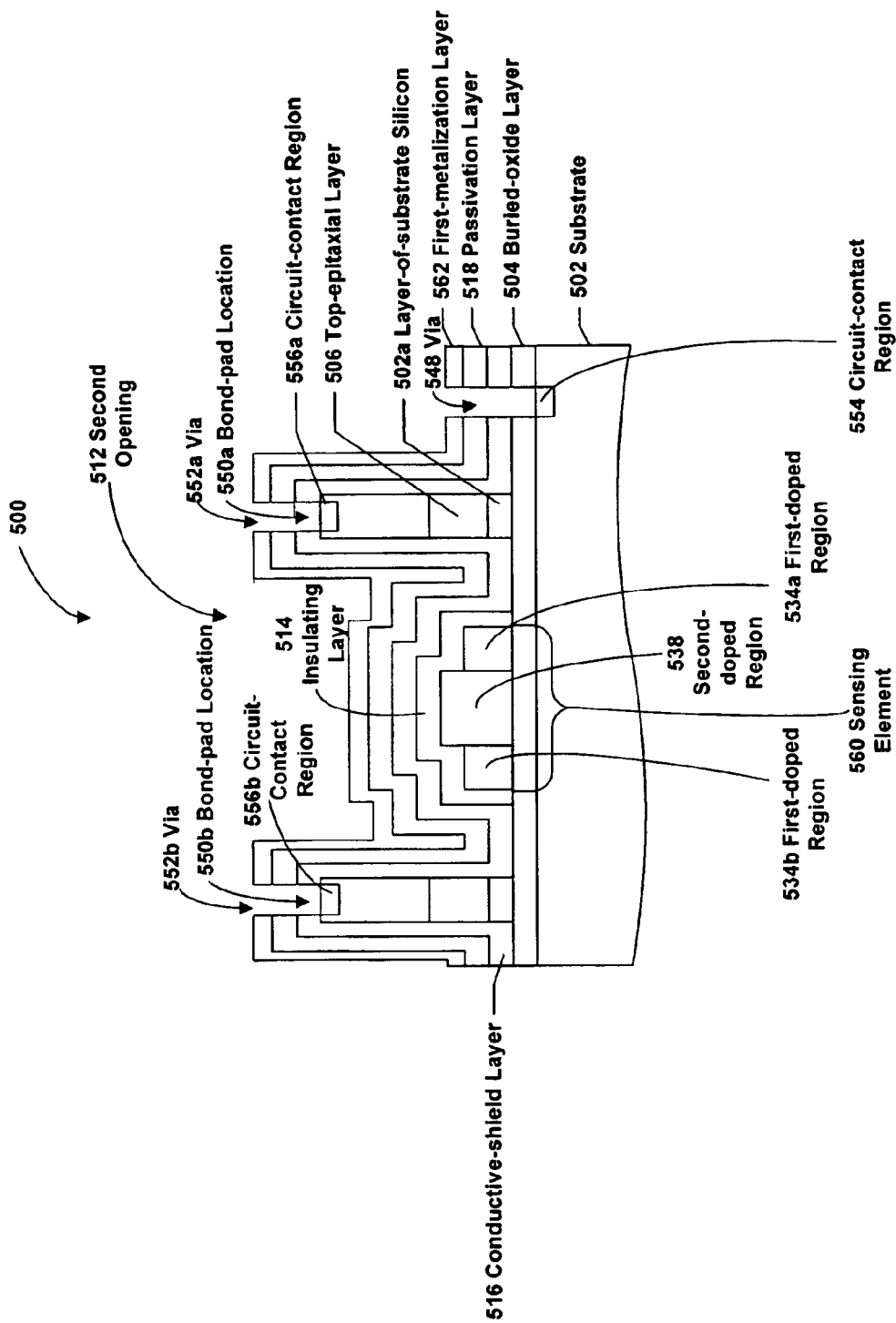
FIGS. 5A, 5B, 5C and 5D are conceptual diagrams each illustrating a side cross-section of an exemplary embodiment of a semiconductor microelectromechanical device with integrated conductive shield at a fifth phase of processing.

Referring to FIG. 5A, the microelectromechanical device 500 includes a substrate 502, a layer-of-substrate silicon 502a, a buried-oxide layer 504, a top-epitaxial layer 506, a thermal-oxide layer 510, at least one second opening 512, an insulating layer 514, a conductive-shield layer 516, first-doped regions 534a and 534b, at least one second-doped region 538, bond pad locations 550a and 550b, and a sensing element 560. In addition, the microelectromechanical device 500 includes vias 548, 552a and 552b and circuit-contact regions 554, 556a and 556b. The microelectromechanical device 500 may also include a passivation layer 518, and a first-metal layer 562 deposited over at least one part of the passivation layer 518. The microelectromechanical device 500 may include several other metal layers (not shown), such as barrier and top-level metalization layers.

The passivation layer 518 may be fabricated from SiO$_2$ deposited or grown over at least a portion of the layers deposited over the substrate 502. Preferably, the passivation layer 518 is deposited over the side of substrate 502 containing the layers of material for creating the microelectromechanical device 500. While the passivation layer 518 may be deposited on the entire side of substrate 502, preferably, predetermined areas of the layers may be masked-off for subsequent processing.

The passivation layer 518 may provide an electro-mechanical barrier against external environments that are impressed upon the microelectromechanical device 500. In one exemplary embodiment, the passivation layer 518 may comprise a silicon nitride layer (Si$_3$N$_4$). In addition to providing an electro-mechanical barrier against external environments, the Si$_3$N$_4$ layer may also provide scratch and moisture protection. The passivation layer 518 fabricated from un-doped Si$_3$N$_4$ may provide a sodium barrier, a strong dielectric, and an oxidation barrier for the elements of the microelectromechanical devices protected by the layer. The passivation layer 518 may be fabricated using other materials, as well.

Vias 548, 550a and 550b provide access to underlying layers of the microelectromechanical device 500. Preferably, vias 552a and 552b provide access to the thermal-oxide layer 510. Vias 552a and 552b may also furnish access to several of the underlying layers for fabricating other elements, such as bond pads and runner paths. Thus, vias 552a and 552b may correspond to the bond pad locations 550a and 550b, respectively. Although only three vias, namely vias 548, 550a and 550b, for accessing underlying layers of the microelectromechanical device 500 are illustrated in FIG. 5, the microelectromechanical device 500 may include more or less than three vias.

Included in the microelectromechanical device 500 is a plurality of substrate circuit-contact regions, such as circuit-contact regions 554, 556a, and 556b. The circuit-contact regions 554, 556a and 556b may include platinum salicide (PtSi) contacts formed over the areas of the substrate 502 that correspond to the areas exposed by vias 548, 550a and 550b, respectively. The substrate circuit-contact regions may include contacts formed from other metals or conductive materials as well.

Figure 5B:
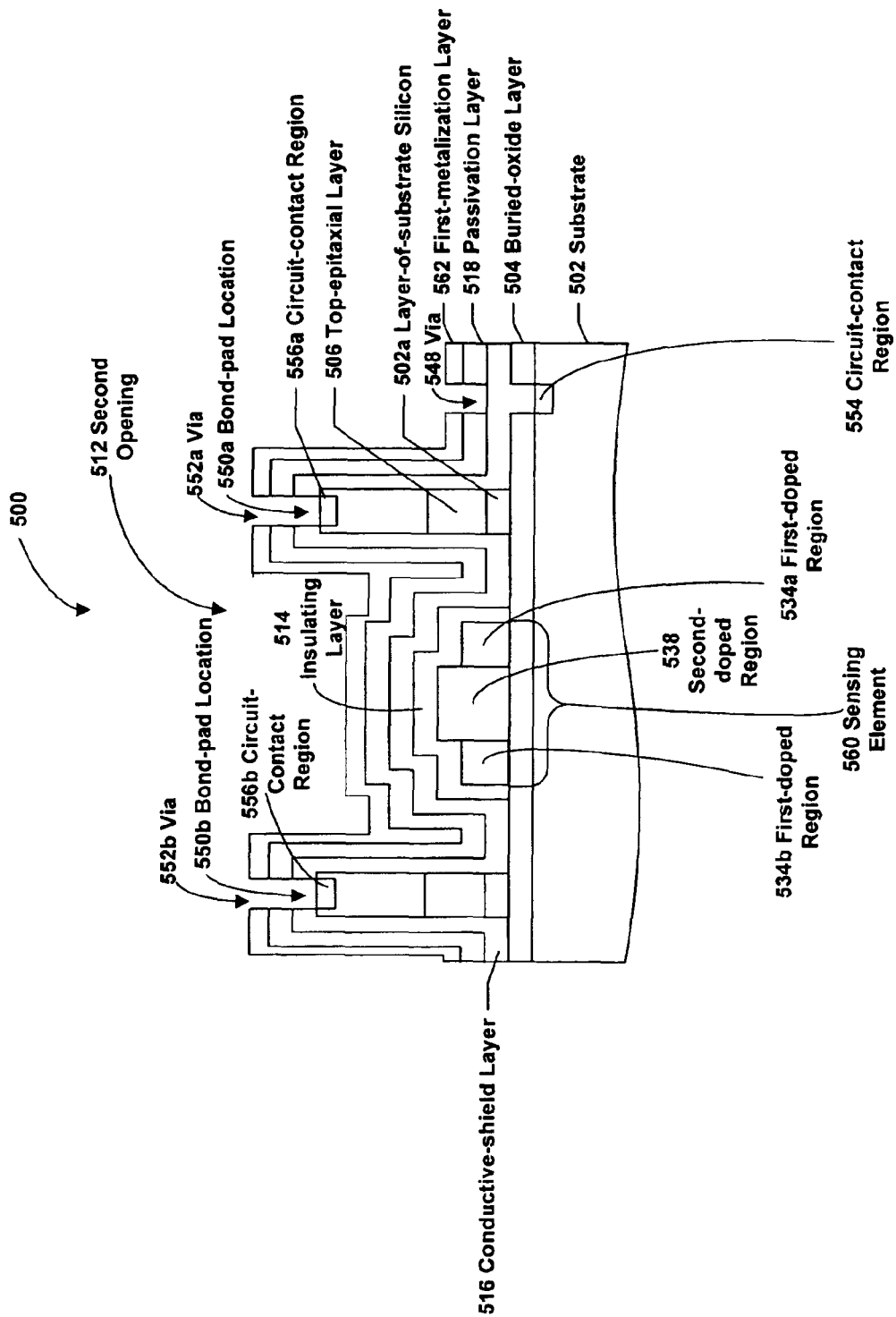

In one embodiment shown in FIG. 5B, circuit-contact region 554 may provide a location for coupling the conductive-shield layer 516 to the substrate 502. The conductive-shield layer 516 may couple or otherwise connect to the substrate 502 at the circuit-contact region 554 through via 548. By coupling the conductive-shield layer 516 to the substrate 502, the conductive shield and the substrate may be placed at substantially the same voltage. This voltage may be at a constant voltage, or alternatively, at varying potentials. Further, the voltage may be at a voltage less than or greater than ground potential, or at ground potential of sensing element.

Alternatively, if the microelectromechanical device 500 is a stand-alone microelectromechanical device having an external node for coupling or otherwise connecting the conductive-shield layer, then the conductive-shield layer 516 may be coupled or otherwise connected with this node. Once coupled or otherwise connected to the external node, the conductive-shield layer 516 may be placed at the voltage of the external node. As another alternative, if the microelectromechanical device 500 is part of another system having a node for coupling or otherwise connecting the conductive-shield layer, the conductive-shield layer 516 may likewise be coupled or otherwise connected with the node of such system. Once coupled or otherwise connected to the node, the conductive-shield layer 516 may be placed at the voltage of the system.

An exemplary arrangement for coupling the conductive-shield layer 516 with the substrate 502 at one of the circuit-contact regions may be provided by simply depositing an N-type-doped-polysilicon-conductive-shield layer over an N-type-circuit-contact region in a P-type substrate. In another exemplary arrangement, the coupling of the conductive-shield layer 516 with the substrate 502 at the substrate circuit-contact region 554 may be provided by the contact created between an N-type doped polysilicon conductive-shield layer deposited over a PtSi contact formed over an N-type circuit-contact region in a P-type substrate.

Figure 5C:
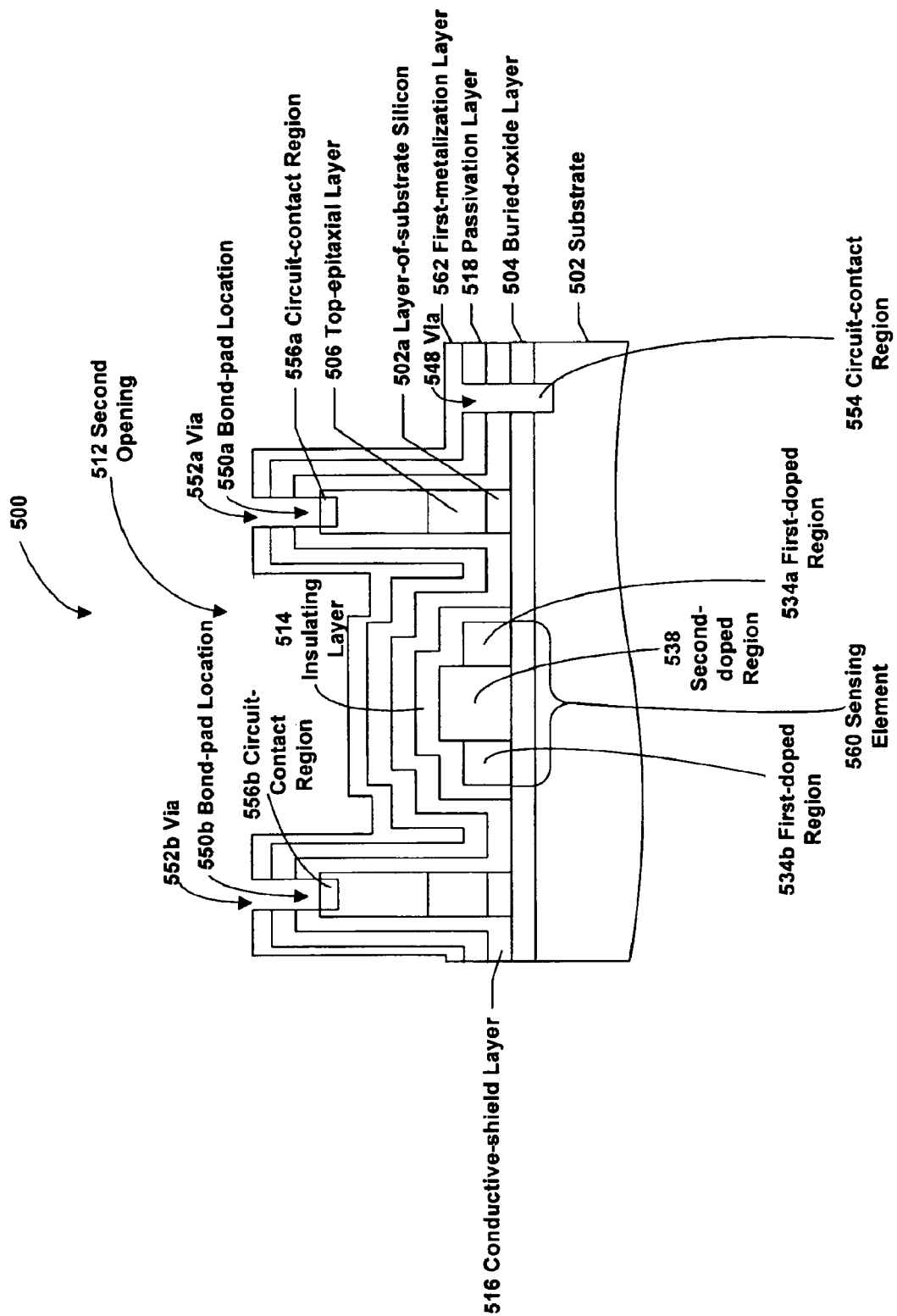
Figure 5D:
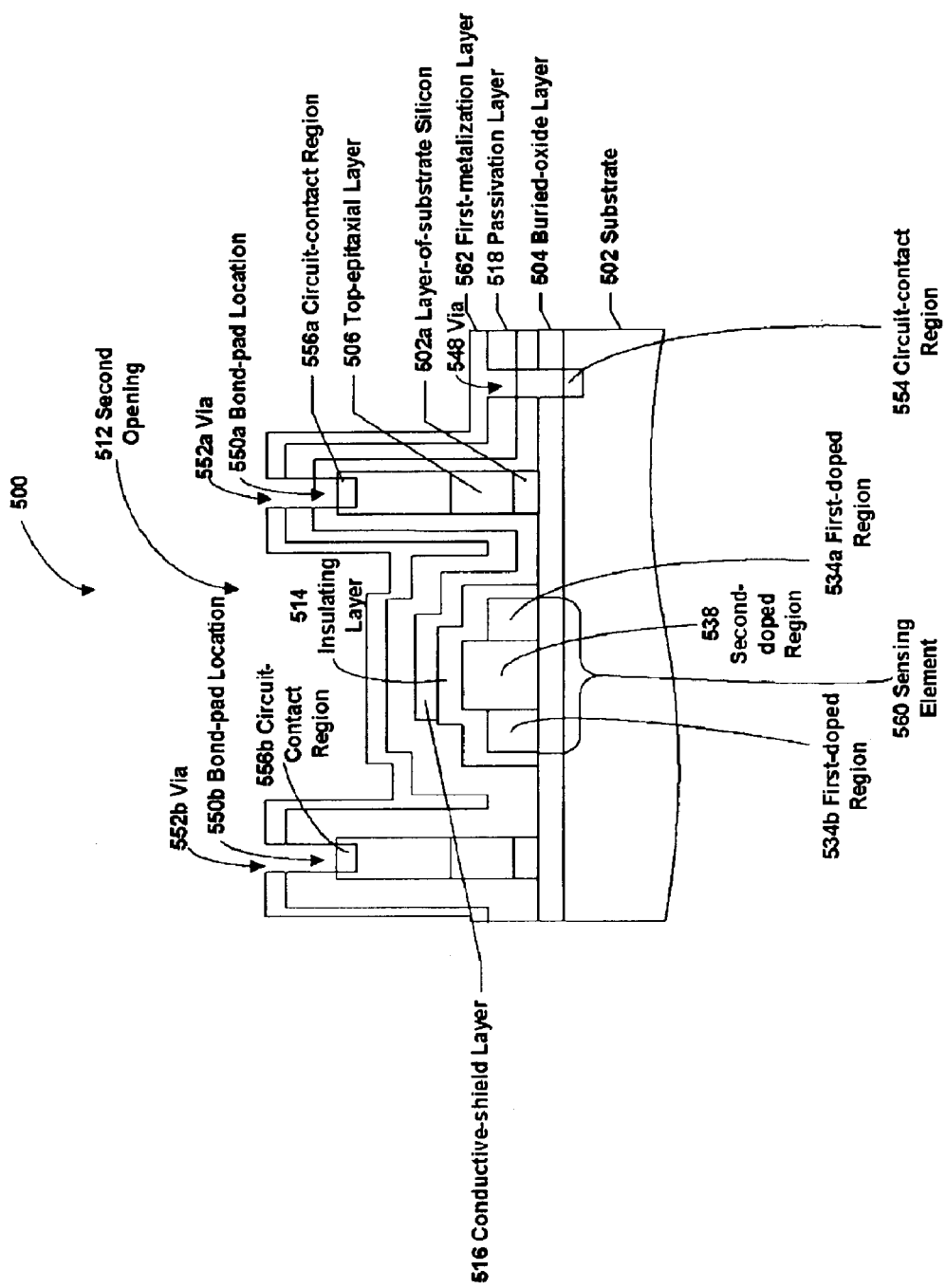

In an alternative arrangement as shown in FIG. 5C, coupling the conductive-shield layer 516 with the substrate 502 may be provided by physical contact between a polysilicon film or metal film deposited directly over the N-type substrate circuit-contact region. In yet another arrangement, the conductive-shield layer 516 may couple with the substrate 502 through via 548. This coupling may be provided by a contact formed from depositing a metal or metallic conductive-shield layer and reacting the metal or metallic conductive-shield layer with an N-type substrate circuit-contact region. Other coupling constructions are possible as well.

Further, depending on how much the conductive-shield layer 516 covers the sensing element 560, coupling the conductive-shield layer 516 with the substrate 502 at circuit-contact region 554 may provide for complete encapsulation of the sensing element 560. Alternatively, coupling the conductive-shield layer 516 with the substrate 502 at circuit-contact region 554 may provide for or partial encapsulation of the sensing element 560 as shown, for example, in FIG. 5D. In the case where the conductive-shield layer 516 provides complete encapsulation of the sensing element 560, the conductive-shield layer 516 may provide protection of the sensing element 560 from undesired ion interference. Partial encapsulation of the sensing element 560 may also provide protection against undesired ion interference, notwithstanding the less than complete encapsulation.

In the presence of one or more forms of energy, e.g., thermal energy, ions captured within the microelectromechanical device's composition may migrate towards the sensing element 560. In addition, ions from energy rich environments may migrate from the energy rich environments towards the sensing element 560. Alternatively, ions from energy rich environments may cause an exchange of energy in the atoms of the microelectromechanical device thereby creating ions within the microelectromechanical device's composition, which may migrate towards the sensing element 560.

For example, ions from an energy rich environment, such as ions derived from silicon oil, that are impressed upon the outer surface of the passivation layer 518 may migrate, at varying rates, through passivation layer 518. Once passing through the passivation layer, these ions may further migrate through voids in the microelectromechanical device's structure. Additionally, the ions from external sources may ionize atoms in the structure of the passivation layer 518, which in turn migrate to the sensing element 560 by exchanging charges amongst the atoms of the passivation and underlying layers.

As another example, bathing the microelectromechanical device 500, which contains a passivation layer 518 fabricated from $Si_3N_4$, in a silicon oil bath containing free ions and subjecting the device to a sufficient energy source may cause random atoms of the $Si_3N_4$ passivation layer 518 to become ionized. With sufficient energy, these charged atoms may migrate towards the sensing element 560 that, in turn, may cause the output of the microelectromechanical device 500 to drift because of the changing electron or hole conduction.

In an exemplary embodiment of the microelectromechanical device 500 in which the conductive-shield layer 516 covers at least one portion of the sensing element 560, and the conductive-shield layer 516 is coupled to a voltage source, undesired ions that migrate from external sources towards the sensing element may be attracted to the conductive-shield layer 516. Similarly, the conductive-shield layer 516 may attract the undesired and internally derived ions or charged atoms. To facilitate ion attraction, the conductive-shield layer 516 is preferably coupled to the substrate 502. Then, the combination is placed at the same voltage, preferably ground potential. Placing the combination at the same voltage may cause the charged atoms to migrate towards the conductive shield, rather than the sensing element 560.

Figure 6:
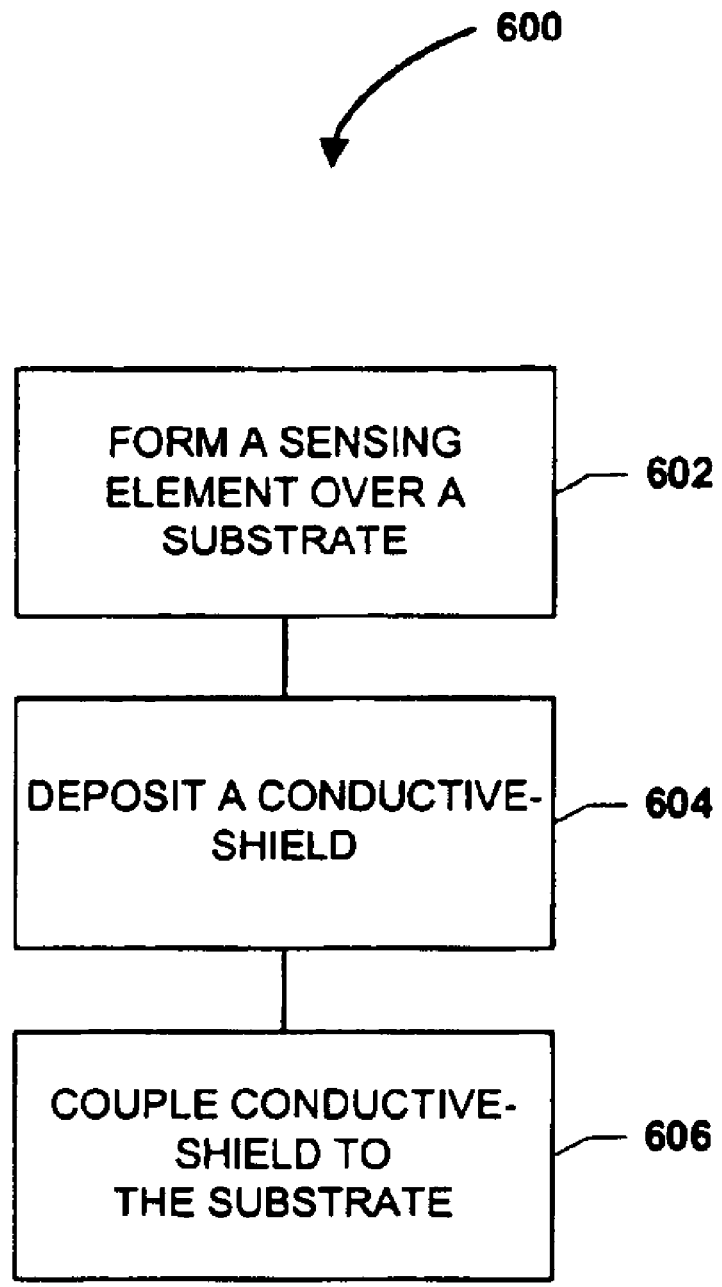
FIG. 6 is a conceptual flow diagram illustrating an exemplary embodiment of the method of fabricating a semiconductor microelectromechanical device with integrated conductive shield.

FIG. 6 is a conceptual flow diagram 600 illustrating functions for carrying out the method of fabricating a semiconductor microelectromechanical device. With reference to FIG. 6, the method includes forming a sensing element on a substrate, as shown in block 602, forming a conductive-shield layer over the sensing element, as shown in block 604, and coupling the conductive-shield layer to the substrate, as shown in block 606.

As illustrated in FIG. 6, an exemplary embodiment of the method of fabricating the microelectromechanical device includes the forming a sensing element on a substrate, as shown in block 602. The sensing element may include the sensor used in pressure sensor devices, accelerometer devices, force sensor devices, humidity sensor devices, level sensor devices, magnetosensor devices, and infrared sensor devices, for example. The sensor, in these devices, may comprise of transistors, diodes, resistors, or capacitors. Forming a sensing element on a substrate, at block 602, may include implanting oxygen into a silicon substrate to create a buried-oxide layer, which in turn creates a layer-of-substrate silicon resting above the buried-oxide layer. Alternatively, forming a sensing on a substrate may include creating a buried-oxide layer using a BSOI, BESOI, or other similar process. In a microelectromechanical device, such as a pressure sensor/transducer, the buried-oxide layer may be implanted beneath one surface of the silicon substrate at about 2000 Å from the surface.

Forming a sensing element on a substrate, as shown in block 602, may also include depositing or disposing an intrinsic top-epitaxial layer over the layer-of-substrate silicon. A top-epitaxial layer having a thickness of about 9000 Å is preferred. Further, forming a sensing element on a substrate, at block 602, may include "growing" a thermal-oxide layer over the applicable areas of the top-epitaxial layer covered substrate. Preferably, the thermal-oxide layer is grown to a thickness of about 13800 Å. At block 602, in the process of forming a sensing element, which includes growing and depositing several layers of semiconductor material, and etching or otherwise removing the several layers, a multi-level, layered configuration of the microelectromechanical device may result.

Moreover, forming a sensing element on a substrate, as shown in block 602, may include performing other integrate circuit fabrication processes, such as patterning and etching the thermal-oxide layer for leads, connection paths, and bond pads. Forming a sensing element on a substrate, as shown in block 602, may additionally include implanting or diffusing selected areas of the deposited and implanted layers with an appropriate N or P type dopant. Preferably, these selected areas are implanted with a Boron dopant dose of at about 2.4E+14 atoms/cm$^2$ at about 80 KeV.

The method of fabricating the microelectromechanical device also includes forming a conductive shield over the sensing element, as shown in block 604. In a multilevel, layered microelectromechanical device, the form of the conductive shield may track the form of underlying layers. Forming the conductive shield over the sensing element may be performed by depositing one or more layers of polysilicon by chemical vapor deposition, such as LPCVD, Ultrahigh Vacuum CVD, and Molecular Bean Expitaxy (MBE). In the preferred microelectromechanical pressure sensor, forming one or more layers of polysilicon may be accomplished by depositing a first and a second layer of polysilicon. Using LPCVD, the first layer of polysilicon may be deposited to achieve a thickness of about 1500 Å. To facilitate depositing the polysilicon layer, one or more parameters of LPCVD process, such as temperature, may be controlled. Preferably, the temperature during deposition is controlled to about 610 degrees Celsius. Like other parameters of the LPCVD process, the temperature, however, may be varied.

Additionally, the second layer of polysilicon, which may comprise mechanical quality or low stress polysilicon, may be deposited by an LPCVD process to achieve a thickness of about 1500 Å. During deposition, the temperature is controlled to at approximately 598 degrees Celsius. As with depositing the first layer of polysilicon, the temperature of the LPCVD process when depositing the second layer of polysilicon may be varied.

During deposition, the conductive shield may require doping the polysilicon, which may be provided in-situ by introducing the proper concentration of N or P type atoms. Alternatively, forming the conductive shield over the sensing element, shown at block 604, may include post-deposition doping by way of ion implantation. In the preferred microelectromechanical-pressure-sensor device, the post-deposition ion implantation may include implanting a phosphorous dopant dose of about 1E+15 atoms/cm2 at about 50 KeV into the deposited polysilicon. In another exemplary alternative, the doping of the polysilicon may be performed using POCl$_3$ deposition and drive in operations.

Forming the conductive shield over the sensing element, shown in block 604, may also include annealing the layered substrate containing the doped polysilicon layer. In a microelectromechanical device such as a pressure sensor or accelerometer, forming a conductive shield over the sensing element, shown in block 604, may preferably include a post-deposition anneal at about 950 degrees Celsius in a nitrogen (N$_2$) environment for a period not less than 250 minutes. Also included in forming a conductive shield over the sensing element, at block 604, are the processing steps for shaping the shield into a specific configuration so that at least part of the sensing element is covered.

In an alternative embodiment, forming the conductive shield over the sensing element, as shown in 604, may include may include depositing a layer of metal, such as copper, aluminum, titanium-tungsten, gold or other metal or alloy. Metal deposition techniques for depositing the conductive shield over the sensing element may include a CVD process, such as Ultrahigh Vacuum CVD.

The method of fabricating the microelectromechanical device also includes coupling the conductive shield to the substrate, as illustrated in block 606. The shape of the conductive shield and the structure of the microelectromechanical device's layers may affect the method of coupling the conductive shield to the substrate. As such, the coupling of the conductive shield to the substrate, at block 606, may vary. For instance, the conductive shield may be coupled to the substrate using capacitive coupling, resistive coupling, or any other electrical coupling.

Coupling the conductive shield to the substrate, as shown in block 606, may include creating a circuit-contact region in the substrate, and connecting the conductive-shield to the circuit-contact region. In a preferred embodiment, this circuit-contact region may be fabricated by ion implanting or diffusing a dopant into the substrate. Alternatively, coupling the conductive shield to the substrate may be accomplished using a metalization-interconnection system, as described in more detail below.

Figure 7:
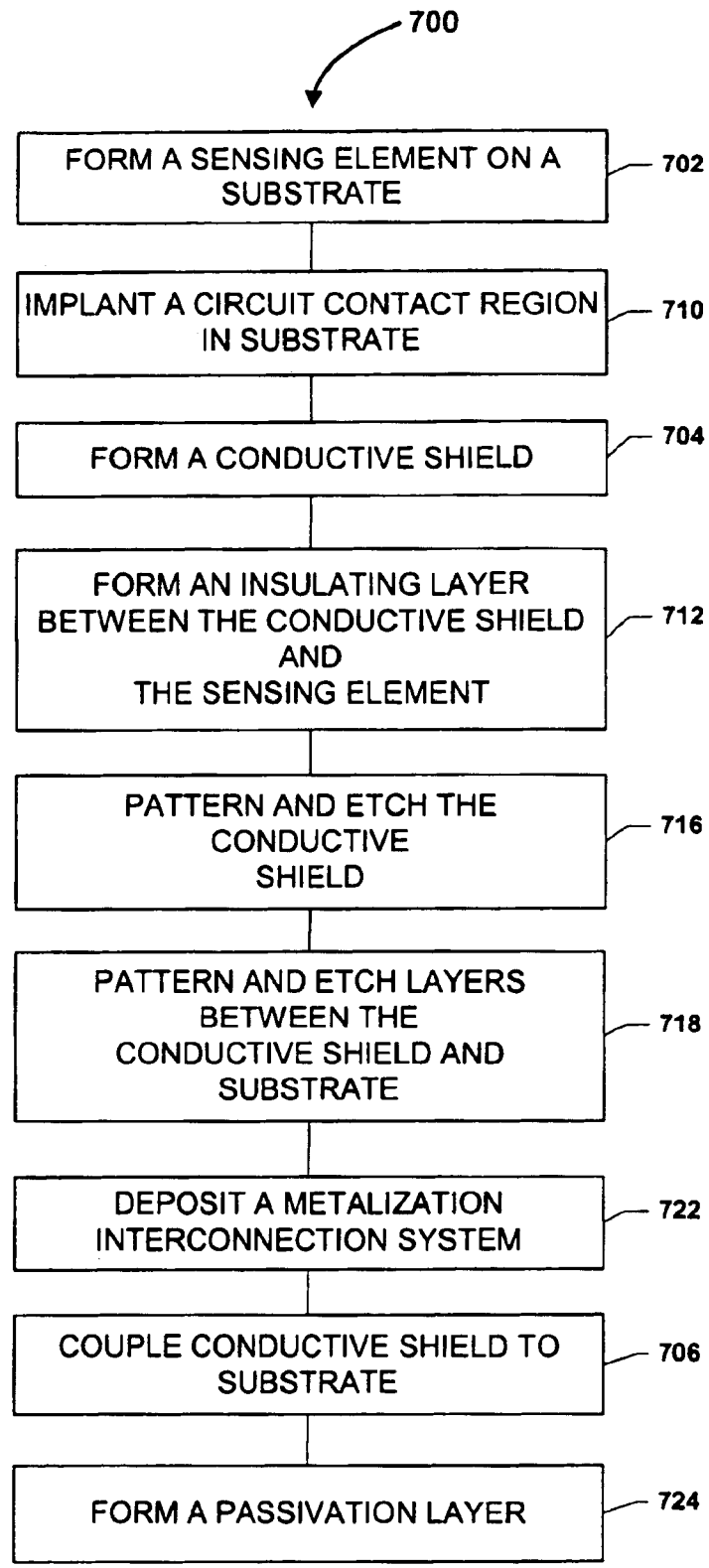
FIG. 7 is a conceptual flow diagram illustrating another exemplary embodiment of the method of fabricating a semiconductor microelectromechanical device with integrated conductive shield.

FIG. 7 is a conceptual flow diagram 700 illustrating alternative functions for carrying out the method of fabricating a microelectromechanical device with an integrated conductive shield. FIG. 7 shows an exemplary flow diagram 700, which is similar to the flow diagram 600 in most respects, except as described herein. In a preferred embodiment, the method of fabricating a semiconductor microelectromechanical may include (i) forming a sensing element on a substrate 702; (ii) creating one or more circuit-contact regions in the substrate, as shown in block 710; (iii) forming a conductive shield, as shown in block 704; (iv) forming an insulating layer between the conductive shield and the sensing element, as shown in block 712; (v) patterning and etching the conductive shield, as shown in block 716; (vi) patterning and etching layers between the conductive shield and substrate, as shown in block 718; (vii) forming a metalization-interconnection system, as shown in block 722; (viii) coupling the conductive shield to substrate, as shown in block 706; and (ix) forming a passivation layer over the substrate, as shown in block 724.

Creating one or more circuit-contact regions in the substrate, as shown in block 710, may be performed by ion implanting or diffusing a dopant into the substrate in selected areas. The doped areas may then be reacted with one or more metals, such as platinum (Pt) and/or copper.

At block 712, forming an insulating layer between the conductive shield and the sensing element may be provided by growing an oxide layer, such as a SiO$_2$ thermal-oxide layer, or depositing another type of insulator. This insulating layer may function as an electrical insulator that separates the sensing element from other layers of the microelectromechanical device. Further, by forming the insulating layer between the conductive shield and sensing element, the insulating layer may protect the sensing element and other layers from mechanical damage.

The method 700 of fabricating the microelectromechanical device also includes forming a conductive shield over the sensing element, as shown in block 704. Forming the conductive shield over the sensing element, as shown in block 704, may include depositing or disposing a conductive shield layer over at least one portion of the sensing element or other part of the substrate using a CVD process. In forming the conductive shield layer, a layer of polysilicon may be deposited over a portion of the layered substrate containing the sensing element, and then the layer of polysilicon may be doped to make it conductive. Alternatively, forming the conductive shield over the sensing element, as shown in block 704, may include depositing a layer of metal, such as copper, aluminum, titanium-tungsten, gold or other metal or alloy over the layered substrate containing the sensing element.

In a preferred embodiment of the fabrication of a microelectromechanical device, the method 700 may include patterning and etching selective areas of the conductive shield to expose areas of the substrate and/or other underlying layers, as shown in block 716. Further, the method 700 of fabricating a microelectromechanical device may include pattering and etching selected areas between the conductive shield and the substrate to expose areas of the substrate and/or other underlying layers, as shown in block 718.

Also included in the method 700 of fabricating a microelectromechanical device is the process of forming a metalization-interconnection system, as shown in block 722. During the process of forming a metalization-interconnection system, the conductive shield may be coupled or connected to the substrate. Forming a metalization-interconnection system, as shown in block 722, may comprise depositing a platinum (Pt) layer of about 650 Å over selected areas of the substrate by sputtering or other metal deposition process. Further, forming a metalization-interconnection system, as shown in block 722, may include reacting the Pt layer with exposed areas of the substrate to create platinum salicide (PtSi) contact areas on the exposed areas of the substrate. Moreover, forming a metalization-interconnection system, as shown in block 722, may include removing residual Pt by an etch process after creating PtSi contacts.

Additionally, at block 722, forming a metalization-interconnection system may include depositing one or more metal layers. These metal layers may be deposited and connected to various layers of the microelectromechanical device. Accordingly, forming a metalization-interconnection system may include depositing a first-level metal, such as titanium-tungsten (TiW), over the exposed areas of the substrate or other underlying layers. The deposition of the first-level metal may be accomplished using a sputtering process or other metal deposition technique. Depositing the first-level metal may provide an electrical contact, or conductive plug, that connects the conductive shield with the PtSi contact on the substrate.

Forming a metalization-interconnection system may also include depositing a second-metal layer, such as gold, using a sputtering process or other metal deposition technique. Depending on the thickness of layers between the conductive shield and the substrate, the thickness of the multilevel metals varies accordingly. Likewise, depending on the location of any layer or layers and the location of the conductive shield, the depositing of a second-metal layer may provide the coupling between the conductive shield and the substrate.

Also included in an embodiment of the method 700 of fabricating a microelectromechanical device is the process of coupling the conductive shield to the substrate, as shown in block 706. Coupling the conductive shield to the substrate, as shown in block 706, may be accomplished by coupling and/or connecting the conductive shield layer to circuit-contact regions located on the substrate. The coupling and/or connecting the conductive shield layer to the circuit-contact regions may be accomplished using a metalization-interconnection system. In an alternative embodiment, the process of coupling the conductive shield to the substrate may include attaching a strap, such as a gold wire, between the conductive shield layer and some external node.

In accordance with the method 700 of providing a microelectromechanical device, coupling or connecting the conductive shield to the substrate may function to preventing ion contamination. To facilitate the process of preventing ion contamination of the sensing element, the combination of the conductive shield and the substrate may be placed at a specific voltage or potential. In some conditions, this combination will be placed at a constant voltage. Alternatively, placing the combination of the conductive shield and the substrate at a voltage greater than the largest output of the sensing element may provide the function of preventing ion contamination of the sensing element. Other voltage options are possible. The options that place the conductive shield at a specific voltage or potential, in effect, cause the conductive shield to attract undesired ions, and function as a Faraday shield.

The method of fabricating the microelectromechanical device also includes forming a passivation layer over the substrate, as shown in block 724. Preferably, forming a passivation layer over the substrate, as shown in block 724, is achieved by depositing a layer of silicon nitride $Si_3N_4$ over the exposed substrate. Alternatively, in the case of a polysilicon-conductive-shield layer, forming a passivation layer over the substrate may be achieved by growing a $SiO_2$ layer over the substrate. In the case of a metal conductive shield, forming a passivation layer over the substrate may be accomplished by forming a silicon layer over a metal conductive shield.

The microelectromechanical device, and method of fabricating the same, results from the realization that the current configurations of non-planar microelectromechanical devices have no conductive layer between the device's elements and the exposed top surfaces of the passivation that stabilizes the microelectromechanical device's output. However, a layer of patterned metal or mechanical-quality, doped polysilicon inserted between the appropriate device element layers may provide a conductive layer to prevent the microelectromechanical device's output from drifting. The conductive layer may form an almost complete encapsulation of the device's elements, or may selectively cover certain of the device's elements. Further, coupling the metal or mechanical-quality, doped polysilicon to the same voltage source as the device's substrate contact may subject the conductive layer to the voltage of the substrate.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

Preferred and alternative embodiments of the present invention have been illustrated and described. It will be understood, however, that changes and modifications may be made to the invention without deviating from its true spirit and scope, as defined by the following claims.

What is claimed is:

1. A semiconductor microelectromechanical device comprising:
   a substrate;
   a sensing element formed on the substrate, wherein the sensing element includes a moveable part; and a conductive shield formed atop at least a portion of the moveable part of the sensing element such that the conductive shield is operable to move along with the at least a portion of the movable part of the sensing element, wherein the conductive shield is coupled to the substrate, and wherein the conductive shield is formed so as to not introduce non-compensatable error into the sensing element when the movable part of the sensing element moves.

2. The semiconductor microelectromechanical device of claim 1, wherein the conductive shield comprises doped silicon.

3. The semiconductor microelectromechanical device of claim 2, wherein the conductive shield comprises doped polysilicon.

4. The semiconductor microelectromechanical device of claim 3, wherein the conductive shield comprises doped, elastic polysilicon.

5. The semiconductor microelectromechanical device of claim 1, further including an insulating layer formed between the sensing element and the conductive shield.

6. The semiconductor microelectromechanical device of claim 5, wherein the insulating layer comprises an oxide film.

7. The semiconductor microelectromechanical device of claim 5, wherein the insulating layer comprises a silicon dioxide (SiO2) film.

8. The semiconductor microelectromechanical device of claim 1, further including a passivation layer formed over the conducting layer.

9. The semiconductor microelectromechanical device of claim 1, wherein the conductive shield coupled to the substrate is placed at substantially the same voltage as the substrate.

10. The semiconductor microelectromechanical device of claim 1, wherein the conductive shield and the substrate provide a complete encapsulation of the sensing element.

11. The semiconductor microelectromechanical device of claim 10, wherein the conductive shield and the substrate are coupled together at a node, and wherein the node is operable to be placed at substantially the same voltage as the substrate.

12. The semiconductor microelectromechanical device of claim 10, wherein the conductive shield and the substrate are coupled together at a node, and wherein the node is operable to be placed at a substantially constant voltage.

13. The semiconductor microelectromechanical device of claim 10, wherein the conductive shield and the substrate are coupled together at a node, and wherein the node is operable to be placed at a varying voltage.

14. The semiconductor microelectromechanical device of claim 10, wherein the substrate comprises at least one node, the at least one node providing a ground voltage, wherein the sensing element formed over the substrate has a ground voltage, wherein the sensing element formed over the substrate is coupled to the substrate, and wherein the conductive shield that is coupled to the substrate is placed at about the ground voltage of the node of the substrate.

15. The semiconductor microelectromechanical device of claim 10, wherein the sensing element comprises a first output that provides a first signal in response to an external force, semiconductor microelectromechanical device further including a second output that provides a second signal having a maximum output voltage proportional to the first signal, and wherein the conductive shield that is coupled to the substrate is placed at a voltage greater than the maximum output voltage of the second signal.

16. The semiconductor microelectromechanical device of claim 1, wherein the conductive shield formed atop the substrate provides a partial encapsulation of the sensing element.

17. The semiconductor microelectromechanical device of claim 16 wherein the conductive shield and the substrate are coupled together at a node, and wherein the node is operable to be placed at substantially the same voltage as the substrate.

18. The semiconductor microelectromechanical device of claim 16 wherein the conductive shield and the substrate are coupled together at a node, and wherein the node is operable to be placed at a substantially constant voltage.

19. The semiconductor microelectromechanical device of claim 16 wherein the conductive shield and the substrate are coupled together at a node, and wherein the node is operable to be placed at a varying voltage.

20. The semiconductor microelectromechanical device of claim 16, wherein the substrate comprises at least one node, the at least one node providing a ground voltage, wherein the sensing element formed over the substrate has a ground voltage, wherein the sensing element formed over the substrate is coupled to the substrate, and wherein the conductive shield that is coupled to the substrate is placed at about the ground voltage of the node of the substrate.

21. The semiconductor microelectromechanical device of claim 16, wherein the sensing element comprises a first output that provides a first signal in response to an external force, semiconductor microelectromechanical device further including a second output that provides a second signal having a maximum output voltage proportional to the first signal, and wherein the conductive shield that is coupled to the substrate is placed at a voltage greater than the maximum output voltage of the second signal.

22. The semiconductor microelectromechanical device of claim 1, wherein the conductive shield is doped to a low resistivity.

23. The semiconductor microelectromechanical device of claim 1, wherein the substrate comprises a silicon wafer, wherein conductive shield is formed atop the sensing element and at least one part of the silicon wafer substrate, and wherein the conductive shield is coupled to the silicon wafer substrate.

24. A semiconductor microelectromechanical device comprising:
   a first-type-dopant substrate;
   a second-type-dopant epitaxial layer;
   at least one sensing element formed in a portion of the second-type-dopant epitaxial layer, wherein the at least one sensing element includes a movable part,
   an insulating layer formed over at least one portion of the at least one sensing element;
   a conductive-polysilicon layer formed atop at least portion of the movable part of the sensing element such that the conductive shield is operable to move along with the at least a portion of the movable part of the sensing element, wherein the conductive shield is formed so as to not Introduce non-compensatable error into the sensing element when the movable part of the sensing element moves;
   a passivation layer formed over the first-type-dopant substrate; and
   at least one via formed between the conductive polysilicon layer and the first-type-dopant substrate, wherein the conductive polysilicon layer is coupled to the first-type-dopant substrate through the at least one via.

25. The semiconductor microelectromechanical device of claim 24, wherein the conductive-polysilicon layer and the first-type-dopant substrate are placed at substantially the same voltage.

26. The semiconductor microelectromechanical device of claim 24, further including an enclosure, and a strap, wherein the strap couples the first-type-dopant substrate and the enclosure.

27. The semiconductor microelectromechanical device of claim 26, wherein the enclosure is placed at a constant potential.

28. The semiconductor microelectromechanical device of claim 24, further including:
- a second-type-dopant region in the first-type-dopant substrate; and
- at least one conductive plug provided in the at least one via coupling the conductive-polysilicon layer and the second-type-dopant region, wherein the conductive-polysilicon layer and the second-type-dopant region are placed at substantially the same potential.

29. A semiconductor microelectromechanical device comprising:
- a substrate;
- a top-epitaxial layer formed over the substrate;
- a thermal-oxide layer grown over at least a portion of the top-epitaxial layer;
- at least one runner patterned and etched in at least a portion of the thermal-oxide layer;
- a sensing element formed in the top-epitaxial layer; and
- a conductive shield formed over at least a portion of the sensing element.

30. The semiconductor microelectromechanical device of claim 29, further including a metalization-interconnection system, wherein the metalization-interconnection system interconnects the conductive-shield layer to the substrate.

31. The device of claim 30, wherein the semiconductor microelectromechanical device is selected from a group consisting of pressure sensors, accelerometers, humidity sensors, automotive sensors, current sensors, fiber optic sensors, force sensors, infrared sensor, mass airflow sensors, photosensors, proximity sensors, level sensors, temperature sensors, turbidity sensors, magnetoresistive sensors, magnetic random access memories or ultrasonic sensors.

32. The device of claim 30, wherein the semiconductor microelectromechanical device comprises a silicon on insulator pressure sensor.

33. The method of claim 32, wherein the top-epitaxial layer is formed to a thickness of about 9000 Å.

34. The device of claim 32, wherein the thermal-oxide layer is grown to a thickness of about 13800 Å.

35. The device of claim 32, wherein the conductive shield comprises a first-conductive-shield layer, and wherein the first-conductive-shield layer is formed to a thickness of about 1500 Å at approximately 610 degrees Celsius.

36. The method of claim 35, wherein the conductive shield further comprises a second-conductive-shield layer, and wherein the second-conductive-shield layer is formed to a thickness of about 1500 Å at approximately 598 degrees Celsius.

* * * * *